United States Patent [19]

Lindner et al.

[11] 4,118,375

[45] Oct. 3, 1978

[54] CROSSLINKABLE POLYACRYLONITRILE COPOLYMERS

[75] Inventors: Christian Lindner, Cologne; Carlhans Suling, Odenthal; Gunter Arend, Dormagen; Dieter Brokmeier, Dormagen; Gunther Nischk, Dormagen, all of Germany

[73] Assignee: Bayer Aktiengesellschaft, Leverkusen, Germany

[21] Appl. No.: 804,857

[22] Filed: Jun. 8, 1977

[30] Foreign Application Priority Data

Jun. 11, 1976 [DE] Fed. Rep. of Germany ....... 2626172

[51] Int. Cl.$^2$ .......................... C08G 2/00; C08G 4/00
[52] U.S. Cl. .................................. 526/240; 260/32.6; 260/32.6 R; 260/66; 526/287; 526/316
[58] Field of Search ............................ 260/63 UY, 66

[56] References Cited

U.S. PATENT DOCUMENTS

| | | | |
|---|---|---|---|
| 2,536,980 | 1/1951 | Jones | 260/66 |
| 3,345,336 | 10/1967 | Kuhlkamp et al. | 260/63 UY |
| 3,542,855 | 11/1970 | Moschel et al. | 260/66 |

*Primary Examiner*—Herbert J. Lilling
*Attorney, Agent, or Firm*—Plumley and Tyner

[57] ABSTRACT

The invention relates to a copolymer comprising at least 40% by weight of copolymerized acrylonitrile, from 0.5 to 40% by weight of at least one copolymerized aceto acetate of a mono (meth) acrylate of an aliphatic diol containing from 2 to 8 carbon atoms and, optionally, at least one other copolymerized comonomer.

6 Claims, No Drawings

CROSSLINKABLE POLYACRYLONITRILE COPOLYMERS

This invention relates to crosslinkable acrylonitrile-containing copolymers which contain as their crosslinkable component a copolymerised acetoacetate of mono (meth) acrylates of aliphatic diols with from 2 to 8 carbon atoms.

Polyacrylonitrile and copolymers of acrylonitrile with other comonomers are eminently suitable for the production of fibres and filaments with excellent textile properties. It is known that acrylonitrile fibres show unsatisfactory dimensional stability under conditions of elevated temperature and relatively high humidity. This poor dimensional stability under hot-wet conditions is reflected in inadequate stitch elasticity, inadequate laundry stability in regard to ironed-in creases and also in creasing and bagging of the textile articles when washed in hot water.

It is known that fibres with a crosslinked structure show improved dimensional stability.

According to Japanese Patent Application No. 43-82768, crosslinked fibres such as these can be obtained by polymerising a monomer mixture of acrylonitrile and an N-methylol compound of an unsaturated amide in an aqueous salt solution containing zinc chloride as its main constituent, spinning the solution of the polymers and carrying out crosslinking on the filaments thus obtained.

According to an earlier proposal, acrylonitrile is copolymerised with a polymerisable unsaturated carboxylic acid amide and an alkyl ether of an N-methylol compound of an unsaturated polymerisable acid amide. The materials, such as filaments and films, produced from copolymers such as these can be crosslinked by heating.

According to another earlier proposal, N-methylol compounds of unsaturated copolymerisable urethanes or bis-urethanes are copolymerised with acrylonitrile. Shaped articles produced from copolymers of this kind can be crosslinked by heating.

Although excellent crosslinked shaped articles, more especially filaments and fibres, can be produced from these polymers, the polymers are still in need of improvement because difficulties are involved in controllably crosslinking the copolymer under defined conditions.

It has now been found that copolymers of acrylonitrile and copolymerised acetoacetates of mono (meth) acrylates of aliphatic diols containing from 2 to 8 carbon atoms show improved properties in regard to controllable and reproducible crosslinking.

Accordingly, the present invention relates to a copolymer comprising at least 40% by weight of copolymerised acroylonitrile, from 0.5 to 40% by weight of at least one copolymerised acetoacetate of a mono (meth) acrylate of an aliphatic diol containing from 2 to 8 carbon atoms and, optionally, at least one other copolymerised comonomer.

The invention also provides a process for producing polymers with the composition defined above.

Finally, the invention relates to the use of polymers with the composition defined above for the production of filaments, fibres and films.

The acetoacetyl alkyl (meth) acrylates are known. Their production is described in GB Patent Specification No. 1,144,486.

Other comonomers which may optionally be used in addition to the acetoacetate of mono (meth) acrylates of aliphatic diols are, preferably, acrylic acid and methacrylic acid alkyl esters such as, for example, (meth) acrylic acid methyl ester and (meth) acrylic acid ethyl ester. Monomers such as these are preferably copolymerised in quantities of up to 10% by weight based on the total monomer content. The usual dye-receptive additives such as, for example, unsaturated sulphonic acid, preferably methally sulphonic acid, vinyl sulphonic acid or styrene sulphonic acid and their alkali metal salts, may also be copolymerised in quantities of up to about 3% by weight. In cases where halogen-containing monomers, for example vinyl chloride or vinylidene chloride, are used for improving fire resistance, they are best used in quantities of from 10 to 30% by weight.

The copolymers according to the invention may be produced by the usual polymerisation processes, for example by solution polymerisation, dispersion polymerisation or suspension polymerisation. Polymerisation is preferably carried out in a precipitant or suspending agent, preferably water. To this end, from 0.5 to 20% by weight and preferably from 0.5 to 10% by weight of the copolymerisable acetoacetate of mono (meth) acrylates of aliphatic diols containing 2 to 8 carbon atoms, preferably ethylene glycol mono methacrylate acetyl acetate, and preferably at least one other comonomer, are polymerised together with at least 40% by weight of acrylonitrile and preferably with at least 80% by weight of acrylonitrile.

The polymerisation initiators used are the known redox systems, preferably potassium, sodium or ammonium peroxodisulphate/potassium or sodium bisulphite, the ratio by weight of the two components of the initiator system generally amounting to between 7:1 and 1:7 and the absolute quantity of the initiator system generally amounting to between 0.5 and 6% by weight, based on the total quantity of monomer. Polymerisation is best carried out at a pH-value of from 6 to 2, preferably from 2.5 to 4.5, and at a temperature of from about 30° C. to 70° C., preferably from 50° C. to 60° C. After a polymerisation time of about 3 to 10 hours, preferably 4 to 6 hours, the polymer is isolated in the usual way by filtration under suction, precipitation or concentration of the solvent. The polymer is then dried for 5 to 15 hours at 30° to 80° C.

Since it is possible, by means of the acetoacetates of mono (meth) acrylates of aliphatic diols, to incorporate into a polymer reactive 1,3-dicarbonyl groups with active methylene groups which are able to enter into a number of reactions, these copolymerisable monomers are valuable starting materials for crosslinkable polymers such as, for example, acrylonitrile copolymers. Copolymers such as these may be crosslinked by aldehydes such as, for example, formaldehyde, alkyl-, arylaldehydes, alkyl-, aryldialdehydes, aliphatic ketones, N-methylol compounds, N-methylol ethers, urotropin or barbituric acid treated with formaldehyde, condensates of urea and ethylene oxide, hexamethylol melamine or the sodium salt of hydroxy methyl sulphinic acid in accordance with BE Patent Specification No. 663,480, or by dihydrazides of dicarboxylic acids in accordance with U.S. Pat. No. 3,345,336 or by tris-aziridinyl-1-phosphine oxide in accordance with DT-AS No. 1,495,797.

These substances crosslink the copolymers according to the invention, for example by adding a crosslinking agent to a solution of the copolymer and inducing crosslinking by heating, by the addition of an acid or, optionally, a base. It is also possible to carry out crosslinking on shaped articles of the polymers according to the invention, for example filaments, fibres or films which contain small amounts of a crosslinking agent.

The unforeseeable advantage of the polymers according to the invention is the fact that crosslinking may readily be carried out by one of the above-mentioned methods and that it is possible, by virtue of the numerous crosslinking possibilities afforded by the use of various crosslinking agents and by the effects of temperature and also by acid/base catalysis, to carry out crosslinking controllably and reproducibly at certain stages of a textile processing cycle.

The new copolymers according to the invention are eminently suitable for the production of filaments, fibres and films with excellent mechanical properties. Although it is possible in principle to vary the molecular weights of the polymers according to the invention within wide limits by known methods, polymers with K-values of from about 70 to 90 are particularly suitable for the production of filaments and fibres.

The K-values quoted in the following Examples were measured on 0.5% solutions of the polymers in dimethyl formamide at 25° C.

The parts and percentages quoted in the following Examples are solely parts and percentages by weight:

EXAMPLE 1

The following three solutions are simultaneously added over a period of 4 hours at 55° C. to a solution of 625 parts by weight of water, 2 parts by weight of 1 N-sulphuric acid and 0.6 parts by weight of sodium lauryl sulphate:

(a)

500 parts by weight of water
8 parts by weight of 1 N-sulphuric acid
1.5 parts by weight of potassium alum
0.7 parts by weight of potassium peroxodisulphate (b)

500 parts by weight of water
4 parts by weight of sodium pyrosulphite (c)

285 parts by weight of acrylonitrile
15 parts by weight of ethylene glycol mono methacrylate acetyl acetate The polymer is then filtered under suction, washed until neutral and dried at 50° C.
Yield: 225 parts by weight (85% of the theoretical), K-value: 88.

EXAMPLE 2

The following three solutions are simultaneously added over a period of 4.5 hours to a solution of 550 parts by weight of water, 1.7 parts by weight of 1 N-sulphuric acid and 0.6 parts by weight of sodium lauryl sulphate:

(a)

500 parts by weight of water
1 part by weight of potassium peroxodisulphate
8 parts by weight of 1 N-sulphuric acid
1.5 parts by weight of potassium alum (b)

500 parts by weight of water
4 parts by weight of sodium pyrosulphite
7 parts by weight of the sodium salt of methallyl sulphonic acid (c)

281 parts by weight of acrylonitrile
12 parts by weight of ethylene glycol mono methacrylate acetyl acetate The polymer is then filtered under suction, washed until neutral and dried at 60° C.
Yield: 267 parts by weight (89% of the theoretical), K-value: 80

EXAMPLE 3

The following three solutions are simultaneously added over a period of 4 hours at 50° C. to a solution of 2300 parts by weight of water, 8 parts by weight of 1 N-sulphuric acid and 2 parts by weight of sodium lauryl sulphate:

(a)

2000 parts by weight of water
32 parts by weight of 1 N-sulphuric acid
5 parts by weight of potassium alum
3 parts by weight of potassium peroxodisulphate (b)

2000 parts by weight of water
17 parts by weight of sodium pyrosulphite (c)

1164 parts by weight of acrylonitrile
36 parts by weight of ethylene glycol mono methacrylate acetyl acetate The polymer is then filtered under suction, washed until neutral and dried at 50° C.
Yield: 1050 parts by weight (88% of the theoretical), K-value: 91.

EXAMPLE 4

The following three solutions are simultaneously added over a period of 4 hours to a solution of 620 parts by weight of water, 2 parts by weight of 1 N-sulphuric acid and 0.3 parts by weight of sodium lauryl sulphate:

(a)

500 parts by weight of water
1.5 parts by weight of potassium alum
8 parts by weight of 1 N-sulphuric acid
0.7 parts by weight of potassium peroxodisulphate (b)

500 parts by weight of water
4 parts by weight of sodium pyrosulphite
6 parts by weight of sodium methallyl sulphonate (c)

276 parts by weight of acrylonitrile
9 parts by weight of ethylene glycol mono methacrylate acetyl acetate
15 parts by weight of methyl acrylate The polymer is then filtered under suction, washed until neutral and dried at 50° C.

Yield: 243 parts by weight (81% of the theoretical), K-value: 89.

EXAMPLE 5

A solution of 500 parts by weight of dimethyl sulphoxide, 114 parts by weight of acrylonitrile and 74 parts by weight of ethylene glycol mono methacrylate acetyl acetate is polymerised under nitrogen at 55° C. by the addition of 0.9 parts by weight of ammonium peroxodisulphate and 1.2 parts by weight of oxalic acid. After 6 hours, the polymer is precipitated with methanol, washed with water and dried at 50° C.

Yield: 153 parts by weight (81% of the theoretical), K-value: 83.

EXAMPLE 6

100 parts by weight of a 10% solution of the product of Example 1 in dimethyl formamide are stirred at room temperature with 6 parts by weight of a 0.4% solution of formaldehyde in dimethyl formamide. A film cast from this mixture and dried at 50° C. is substantially insoluble in all solvents; the film is crosslinked.

EXAMPLE 7

120 parts by weight of a 20% solution of the product of Example 3 in dimethyl formamide are stirred at room temperature with 6 parts by weight of a 1% solution of pentane dial in dimethyl formamide and 7 parts by weight of a 0.5% solution of ammonium acetate in a mixture of dimethyl formamide and water (99:1). A solid gel has formed from the polymer solution within a few minutes. Polymer isolated therefrom is substantially insoluble in all solvents; the polymer is crosslinked.

EXAMPLE 8

100 parts by weight of a 10% solution of the product of Example 1 in dimethyl formamide are stirred at room temperature with 10 parts by weight of a 1% solution of terephthalic dialdehyde in dimethyl formamide and 5 parts by weight of a 0.5% solution of ammonium acetate in a mixture of dimethyl formamide and water (99:1). A film cast from this mixture and dried at 50° C. contains only small amounts of polymer soluble in dimethyl formamide; the film is crosslinked.

EXAMPLE 9

100 parts by weight of a 10% solution of the product of Example 4 in dimethyl formamide are stirred at room temperature with 10 parts by weight of a 1% solution of a melamine-formaldehyde precondensate (Cohedur A, a product of Bayer A.G., Leverkusen). Part of this mixture is heated for 2 minutes to 150° C. and cooled to room temperature. The polymer solution has solidified into a gel; the polymer is crosslinked.

A film is cast from another portion of the solution and dried for 20 hours at 70° C. The film thus treated is substantially insoluble in all solvents; the film is crosslinked.

The viscosity of the remainder of the mixture remains constant over a period of 6 hours at room temperature. Accordingly, no crosslinking takes place.

EXAMPLE 10

100 parts by weight of a 10% solution of the product of Example 1 in dimethyl formamide are stirred with 6 parts by weight of a 1% solution of adipic acid dihydrazide and 1 part by weight of a 0.5% solution of acetic acid in dimethyl formamide. A film cast from this mixture and dried at 50° C. is substantially insoluble in all solvents. The film is crosslinked.

EXAMPLE 11

0.1 parts by weight of urotropin are added to 100 parts by weight of a 10% solution of the product of Example 1 in dimethyl formamide, followed by tempering with stirring for 2 minutes at 155° C. After cooling of the polymer solution, a gel has formed. Polymer isolated therefrom is substantially insoluble in all solvents. The product is crosslinked.

EXAMPLE 12

120 parts by weight of a 10% solution of the product of Example 3 in dimethyl formamide are stirred at room temperature with 4 parts by weight of a 1% solution of pentane dial in dimethyl formamide. A film cast from this solution and dried at 40° C. is subsequently boiled for 5 minutes in a 0.4% ammonium acetate solution in water, washed with water at room temperature and dried at 50° C. A film treated in this way contains only small amounts of polymer soluble in dimethyl formamide. The film is crosslinked.

EXAMPLE 13

100 parts by weight of a 10% solution of the product of Example 5 in acetone are stirred with 6 parts by weight of a 1% solution of piperidine in acetone. A film cast from this mixture and dried for 20 hours at 50° C. contains only small amounts of polymer soluble in acetone or dimethyl formamide. The film is crosslinked.

EXAMPLE 14

A film is drawn from a solution of the product of Example 1 in DMF. This film is dried at 70° C., boiled for 20 minutes with water and redried at 50° to 60° C. The films are impregnated for 20 minutes at 60° C. in a 5% aqueous formalin solution and dried at 60° C. The film is crosslinked by tempering for 20 minutes at 160° C., after which it only contains small amounts of polymer soluble in DMF.

What is claimed is:

1. An addition copolymer, comprising (1) at least 40% by weight of acrylonitrile; (2) from 0.5 to 40% by weight of at least one acetoacetate of a monoacrylate or a monomethacrylate of an aliphatic diol containing from 2 to 8 carbon atoms; and (3) 0–10% by weight of a acrylic acid or a methacrylic acid alkyl ester; 0–3% by weight of methallyl sulfonic acid, vinyl sulfonic acid, styrene sulfonic acid, or their alkali metal salts; or 0% or 10–30% by weight of vinyl chloride or vinylidene chloride.

2. The copolymer of claim 1, wherein acrylonitrile comprises at least 80% by weight of the copolymer and the acetoacetate of a monoacrylate or a monomethacrylate of an aliphatic diol containing from 2 to 8 carbon atoms comprises from 0.5 to 20% by weight of the copolymer.

3. The copolymer of claim 1, wherein the aliphatic diol contains from 2 to 4 carbon atoms.

4. A process for the production of an addition copolymer of acrylonitrile, which comprises copolymerizing a mixture of (1) at least 40% by weight of acrylonitrile; (2) from 0.5 to 40% by weight of at least one acetoacetate of a monoacrylate or a monomethacrylate of an aliphatic diol containing from 2 to 8 carbon atoms; and (3) 0–10% by weight of a acrylic acid or a methacrylic acid alkyl ester; 0–3% by weight of methallyl sulfonic acid, vinyl sulfonic acid, styrene sulfonic acid, or their alkali metal salts; or 0% or 10–30% by weight of vinyl chloride or vinylidene chloride.

5. The process of claim 4, wherein the mixture contains at least 80% by weight of acrylonitrile and 0.5 to 20% by weight of at least one acetyl acetate of a monoacrylate or a monomethacrylate of an aliphatic diol containing from 2 to 8 carbon atoms.

6. The process of claim 4, wherein the mixture contains at least one acetoacetate of a monoacrylate or a monomethacrylate of an aliphatic diol containing from 2 to 4 carbon atoms.

* * * * *